3,002,015
PROCESS FOR PREPARING PHOSPHORUS COMPOUNDS
James O. Clayton, Berkeley, Calif., assignor to California Research Corporation, San Francisco, Calif., a corporation of Delaware
No Drawing. Filed July 20, 1959, Ser. No. 828,055
3 Claims. (Cl. 260—461)

This invention relates to a process for making phosphorus compounds, useful as additives for gasoline. More particularly, it relates to a process for making mixtures of esters of alkane-phosphonic acids and phosphoric acid, the physical properties of which are especially useful as additives for gasoline.

According to the invention a nonaromatic hydrocarbon is reacted with phosphorus trichloride and oxygen, and the resulting acid chloride mixture is reacted with a monohydroxyl organic compound, that is, a phenol or an alcohol to form a mixture of esters. While any nonaromatic hydrocarbon may be used in the process and the resulting ester will be useful as a gasoline additive, it is preferred to use relatively low molecular weight hydrocarbons containing from about four to about ten carbon atoms. The hydrocarbons may be paraffinic, cycloparaffinic, olefinic, or acetylenic; and all of these types are equally effective. The presence of aromatic substituents in these foregoing hydrocarbons or aromatic hydrocarbons in admixture therewith does not have an adverse effect on the reaction, but the aromatic rings will not enter into the reaction. Consequently, a mixture of hydrocarbons comprising substantially aliphatic and olefinic hydrocarbons may be used. Preferred hydrocarbons are characterized by having at least two hydrogen atoms for each carbon atom in the molecule, and expressed differently at least 14.28% hydrogen in the molecule.

The process of this invention produces esters of acids of phosphorus which are peculiarly effective in preventing preignition and controlling rumble when employed in gasoline used in high compression spark ignition engines. Various phosphorus compounds have been suggested as additives for gasoline containing lead alkyls, but many of these phosphorus compounds have not been completely satisfactory. The reasons for the especial effectiveness of the compounds of the present invention are not completely understood but may be due to the particular admixture of esters of acids of phosphorus produced in the process. Thus, the phenyl esters of the present invention are liquid and do not have the disadvantage of the high melting point of triphenyl phosphate. Trimethyl phosphate and other low molecular weight trialkyl phosphates are unsatisfactory, probably due to hydrolysis under service conditions while the lower alkyl esters of the present invention do not appear to suffer from this disadvantage. The esters of acids of phosphorus of the present invention are used in leaded gasoline in amounts varying from about 0.1 to 1.0 mole of ester per gram atom of lead.

The first step of the process involving the formation of acid chlorides of phosphorus is complex, and can result in the production of different chemical species even when using a pure hydrocarbon as starting material. For this first step, paraffinic and cycloparaffinic hydrocarbons can be reacted with phosphorus trichloride and oxygen, as fully disclosed in U.S. Patent 2,683,168. The mechanism of the reaction of olefinic and acetylenic hydrocarbons with phosphorus trichloride and oxygen is different from that of paraffinic or cycloparaffinic hydrocarbons, and the compounds resulting from the former reaction contain chlorine which is not removed by hydrolysis. The method of carrying out the process and the reaction conditions are the same whether the hydrocarbon is saturated or unsaturated and in all cases phosphonyl chlorides are formed among other products. A catalyst for these reactions is not essential, but acyl peroxides may be used, particularly when employing olefinic and acetylenic hydrocarbons.

The second step of the process involves esterification of the mixed acid chlorides. This may be carried out by treating the reaction product of the first step with an alcohol or phenol until the evolution of hydrogen chloride has ceased. The addition of an alcohol to the mixture of acid chlorides generally causes a vigorous reaction to occur even at room temperature or below. The reaction rate is lower in the case of a phenol and the mixture must be heated to insure completion of the reaction. It is preferred to initiate the reaction at about room temperature and to heat the mixture gradually to a final temperature of 200° C. or higher. A stream of inert gas or a vacuum may be used to facilitate removal of hydrogen chloride. It is preferred to use three moles of alcohol or phenol for each mole of phosphorus trichloride charged although a larger excess may be used to insure complete reaction. The excess may be removed by distillation if desired, although this is not essential. A pyridine base or inorganic base may be added when the evolution of hydrogen chloride has decreased to a slow rate, although this is not essential and is considered an obvious equivalent to allowing the reaction to proceed with the evolution of gaseous hydrogen chloride. Hydrocarbons which can be used in the process include pure nonaromatic hydrocarbons and mixtures of hydrocarbons containing from about four to about ten carbon atoms. The hydrocarbons can be straight-chain or branched-chain acyclic hydrocarbons and cycloparaffins, or cycloolefins. Aromatic rings need not be excluded in mixtures, but mixtures must be predominantly nonaromatic. Such mixtures of hydrocarbons may be derived from petroleum, but other sources of aliphatic, cycloaliphatic, olefinic and acetylenic hydrocarbons such as terpenes are equally satisfactory. Examples of pure hydrocarbons include n-butane, isobutane, n-hexane, n-octane, 2,2,4-trimethylpentane, n-decane, butene-1, isobutene, 4-methylpentene-1, octene-2, mixed decenes, cyclopentane, and methylcyclohexane. Examples of mixtures of hydrocarbons include ligroine and light naphtha. The naphtha should be predominantly nonaromatic and should distill from about 20° to about 350° F.

In the second step of the process, monohydroxyl organic compounds, that is, alcohols or phenols, can be used for esterification. While alcohols or phenols of practically any molecular weight can be used, those having molecular weights below about 130 are preferred. Examples include methanol, ethanol, propanol, isopropanol, sec-butanol, tert-butanol, 2-methylbutanol, isoamyl alcohol, n-hexanol, n-heptanol, n-octanol, capryl alcohol, 2-ethylhexanol, phenol, o-cresol, m-cresol, p-cresol, mixed cresols, and mixed xylenols.

The equipment used in carrying out the process of the invention is comparatively simple comprising in essence a single reaction vessel equipped with means for heating or cooling, a gas diffuser, reflux equipment, and lines for introducing the reactants and withdrawing the product. A hydrocarbon as previously defined and phosphorus trichloride are charged to the reaction vessel. The mole ratio of phosphorus trichloride to hydrocarbon can vary from 1:1 to 5:1. Oxygen or gas mixture containing oxygen such as air is passed through the liquid in the reaction vessel using a suitable diffuser to insure contact between the oxygen and hydrocarbon-phosphorus trichloride mixture. The reaction is exothermic, and the temperature can be controlled by the rate of introduction of oxygen, by refluxing, by addition or withdrawal of heat through a heat exchanger, or by a combination of these means. The reaction temperature is not critical and may be varied from temperatures well below 0° C. to as high as 80° C. or higher. At temperatures above 80° C., which is the normal boiling point of phosphorus trichloride, pressure equipment must be used. It is preferred to regulate the temperature by refluxing of either a hydrocarbon component of the reaction mixture or of phosphorus trichloride. Usually, hydrogen chloride is evolved in the reaction, but this evolution may be small in the case of a pure olefin. The completion of the reaction is indicated by a temperature drop.

When the first-stage reaction is completed, an alcohol or a phenol is charged directly to the reactor. About 3 moles of alcohol or phenol is added for each mole of phosphorus trichloride used in the first stage. An exothermic reaction ensues with the liberation of large quantities of hydrogen chloride. The reaction temperature is usually controlled by refluxing, but heating or cooling may be employed. Near the completion of the reaction when the heat evolution is small, it is desirable to supply heat to reflux to insure completion. The resulting ester mixture will contain excess alcohol or phenol which can be removed by distillation or washing, but usually this is not necessary since the presence of small amounts of alcohols or phenols has no adverse effect on the properties of the gasoline additive.

The practice of the invention is illustrated by the following examples:

*Example I.*—Twenty-five gallons of a light naphtha containing 43% paraffins plus naphthenes, 34% olefins, and 23% aromatics is charged to a 200-gallon glass-lined jacketed reactor equipped with a reflux drum and a porous diffuser for admitting air. The initial boiling point of this naphtha is 90° F., and the end point 295° F. Four hundred sixty-four pounds of phosphorus trichloride is added to the naphtha in the reaction vessel, being an amount sufficient to provide 3 moles of phosphorus trichloride for every mole of paraffin plus naphthene plus olefin in the naphtha. After sealing the reactor, air is blown through the diffuser, the air rate being adjusted so that the reaction heat can be removed by the reflux drum. The time required for completion of the reaction in this type of equipment is about four to five hours.

When this phase of the reaction is complete, the mixture in the reactor is allowed to cool to ambient temperature which can be facilitated by continuing air blowing and passing cold water through the jacket. Five hundred fifty pounds of isopropyl alcohol is then added and allowed to react with the acid chlorides in the reactor causing evolution of hydrogen chloride and refluxing due to the heat of reaction. After the vigorous reaction has subsided, steam is introduced to the jacket of the kettle for three hours to complete the reaction. The reaction product amounting to about 850 pounds (105 gallons) is withdrawn from the kettle.

*Example II.*—Fifteen gallons of commercial heptane is charged to a 200-gallon glass-lined, jacketed reactor equipped with a reflux drum and a porous diffuser for admitting air. Four hundred sixty-five pounds of phosphorus trichloride is added to the heptane, amounting to 4 moles of phosphorus trichloride for each mole of heptane. After sealing the reactor air is introduced as in the preceding example.

After the initial step of the reaction is completed and the reactor contents cooled to approximately ambient temperature, 880 pounds of molten phenol is introduced. The esterification is finally completed by admitting steam into the jacket as in Example I. The reaction product amounting to about 1100 pounds (175 gallons) is withdrawn from the kettle.

*Example III.*—Fifteen gallons of mixed pentene is charged to a 200-gallon glass-lined jacketed reactor equipped with a reflux drum and a porous diffuser for admitting air. Five hundred nine pounds of phosphorus trichloride is then added producing an equimolar mixture of pentene and phosphorus trichloride. Air is introduced as in the preceding examples.

The esterification is carried out by adding 237 pounds of methanol to the reactor and completing the esterification as in the preceding examples. The reaction product amounting to about 800 pounds (100 gallons) is withdrawn.

I claim:

1. A process for producing a composition containing esters of mixed acids of phosphorus which comprises reacting one mole of nonaromatic hydrocarbon containing from four to ten carbon atoms with from one to five moles of phosphorus trichloride in the presence of oxygen at temperatures lying between about 0° C. and 80° C. to form a mixture containing acid chlorides of phosphorus and esterifying said mixture with phenol consisting only of the elements C, H and O, and containing a total of from six to eight carbon atoms, about three moles of said phenol being added for each mole of phosphorus trichloride.

2. A process for producing a composition containing esters of mixed acids of phosporus which comprises reacting one mole of nonaromatic hydrocarbon containing from four to ten carbon atoms with from one to five moles of phosphorus trichloride in the presence of oxygen at temperatures lying between about 0° C. and 80° C. to form a mixture containing acid chlorides of phosphorus and esterifying said mixture with phenol, about three moles of said phenol being added for each mole of phosphorus trichloride.

3. A process for producing a composition containing esters of mixed acids of phosphorus which comprises reacting one mole of nonaromatic hydrocarbon containing from four to ten carbon atoms with from one to five moles of phosphorus trichloride in the presence of oxygen at temperatures lying between about 0° C. and 80° C. to form a mixture containing acid chlorides of phosphorus and esterifying said mixture with cresol, about three moles of said cresol being added for each mole of phosphorus trichloride.

References Cited in the file of this patent

UNITED STATES PATENTS

| | | |
|---|---|---|
| 2,668,842 | Tolkmith | Feb. 9, 1954 |
| 2,668,845 | Tolkmith | Feb. 9, 1954 |
| 2,683,168 | Jensen | July 6, 1954 |
| 2,772,308 | Jensen | Nov. 27, 1956 |
| 2,795,609 | Jensen | June 11, 1957 |
| 2,900,405 | McCall et al. | Aug. 18, 1959 |
| 2,922,810 | Toy et al. | Jan. 26, 1960 |